(12) United States Patent
Klein

(10) Patent No.: US 10,073,640 B1
(45) Date of Patent: Sep. 11, 2018

(54) LARGE SCALE IMPLEMENTATION OF A PLURALITY OF OPEN CHANNEL SOLID STATE DRIVES

(71) Applicant: Toshiba Memory Corporation, Minato-ku, Tokyo (JP)

(72) Inventor: Yaron Klein, Raanana (IL)

(73) Assignee: Toshiba Memory Corporation, Tokyo (JP)

( * ) Notice: Subject to any disclaimer, the term of this patent is extended or adjusted under 35 U.S.C. 154(b) by 0 days.

(21) Appl. No.: 15/456,308

(22) Filed: Mar. 10, 2017

(51) Int. Cl.
*G06F 12/00* (2006.01)
*G06F 3/06* (2006.01)

(52) U.S. Cl.
CPC .......... *G06F 3/0619* (2013.01); *G06F 3/0631* (2013.01); *G06F 3/0659* (2013.01); *G06F 3/0688* (2013.01)

(58) Field of Classification Search
None
See application file for complete search history.

(56) References Cited

U.S. PATENT DOCUMENTS

| | | | |
|---|---|---|---|
| 6,092,168 | A | 7/2000 | Voigt |
| 7,376,895 | B2 | 5/2008 | Tsao |
| 7,765,378 | B1 | 7/2010 | Georgiev |
| 8,848,710 | B2 | 9/2014 | Sundarrajan et al. |
| 9,251,295 | B2 | 2/2016 | Adams et al. |
| 9,785,572 | B1 * | 10/2017 | Lercari .................. G06F 3/064 |
| 2007/0198793 | A1 | 8/2007 | Jafri et al. |
| 2010/0174876 | A1 | 7/2010 | Kasahara et al. |
| 2010/0223221 | A1 | 9/2010 | Gardner et al. |
| 2014/0047159 | A1 * | 2/2014 | Ahwal .................. G06F 3/0608 711/103 |
| 2014/0279837 | A1 | 9/2014 | Guo et al. |
| 2014/0310574 | A1 | 10/2014 | Yu et al. |

(Continued)

FOREIGN PATENT DOCUMENTS

| | | |
|---|---|---|
| CA | 2084132 A1 | 7/1993 |
| CN | 104166651 A | 11/2014 |

OTHER PUBLICATIONS

Huang, FlashBlox: Achieving Both Performance Isolation and Uniform Lifetime for Virtualized SSDs, 15th USENIX Conference on File and Storage Technologies Feb. 27-Mar. 2, 2017 (Year: 2017).*

(Continued)

*Primary Examiner* — Prasith Thammavong
*Assistant Examiner* — Jason W Blust
(74) *Attorney, Agent, or Firm* — White & Case LLP

(57) ABSTRACT

In one embodiment a plurality of open channel solid state drives (SSDs) are implemented over a network comprised of a network switch having a plurality of nodes, a remote host connected to a first node of the network switch, a metadata server connected to a second node of the network switch, and an abstracted memory structure comprised of at least part of one of the plurality of open channel SSDs. In one embodiment, the remote host is configured to communicate with the metadata server by issuing a command identifying data related to the abstracted memory structure. In another embodiment, the metadata server is configured to communicate with the remote host by responding to the command and identifying a physical address corresponding to the identified data.

20 Claims, 9 Drawing Sheets

(56) References Cited

U.S. PATENT DOCUMENTS

2015/0339319 A1   11/2015  Malina
2017/0344285 A1* 11/2017  Choi ..................... G06F 3/0619

OTHER PUBLICATIONS

Bjørling, LightNVM: The Linux Open-Channel SSD Subsystem, 15th USENIX Conference on File and Storage Technologies Feb. 27-Mar. 2, 2017 (Year: 2017).*
OpenChannel Solid State Drives NVMe Specification rev 1.2, Apr. 2016 (Year: 2016).*

* cited by examiner

LARGE SCALE IMPLEMENTATION OF A PLURALITY OF OPEN CHANNEL SOLID STATE DRIVES

FIELD OF THE INVENTION

This invention generally relates to large scale implementation of a plurality of open channel (OC) solid state drives (SSDs) over a network.

BACKGROUND OF THE INVENTION

Modern data centers are comprised of magnetic hard disk drives (HDD) and/or SSDs. Although SSDs operate using different technology than HDDs, SSDs provide the same interface and functionality as HDDs for compatibility with existing data center operating systems. A typical SSD is comprised of non-volatile NAND media (comprised of memory blocks and pages capable of retaining data when power is disconnected), a controller and an interface (e.g., PCIe, SAS, SATA, or any other interface).

NAND SSDs are equipped with a flash translation layer (FTL) in the SSD controller that translates logical block addresses from a host device (e.g., addresses used in read, write commands from a computer) to low-level flash operations for the associated physical block and page addresses of the NAND SSD. The embedded FTL also performs numerous other functions, including: error code correction (i.e., use of redundant data, or parity data to recover a message with errors); garbage collection (i.e., identifying/invalidating stale data in blocks of memory for deletion to free space for future writes); scheduling (i.e., controlling the order in which read and write commands from the host device are executed); over-provisioning (i.e., SSD memory reserved for maintaining write speed); and wear-leveling (i.e., spreading writes across the blocks of the SSD as evenly as possible to ensure that all blocks of the device wear at a roughly similar rate). Because the FTL of NAND SSDs can accommodate the logical interface of host devices, NAND SSDs easily integrate with standard hard disk drive (HDD) compatible interfaces and offload overhead that would otherwise be needed for the host device to perform the functions of the FTL.

Although traditional NAND SSDs are easy to integrate and have the advantage of the FTL offloading host device overhead, a traditional host device HDD interface is not capable of taking full advantage of the performance of a NAND SSD. For example, the host device is not capable of issuing low-level commands that govern how data is programmed and erased in the SSD and the SSD is not aware of when the host device will issue read and write commands. Accordingly, while both the FTL and the host device employ best effort approaches for performing their independent functions, the result is still inefficient utilization of NAND SSD resources, including unpredictable data storage and increased wear-leveling.

One technique for increasing efficiency between a host-device with a conventional HDD-interface and the FTL of a NAND SSD is through an application program interface (API) that shares valuable information between such devices (i.e., through Storage Intelligence). However, this has not proven to be an achievable approach as the complexity of coordinating FTL functionality with host device functionality can further reduce efficiency of the NAND SSD.

Another technique involves using a NAND SSD that does not have a firmware FTL, which requires the host device operating system to manage the physical solid-state storage. The Linux 4.4 kernel is an example of an operating system kernel that supports open-channel SSDs which follow the NVM Express specification, by providing an abstraction layer called LightNVM. However, open-channel SSDs require significant overhead as the host device operating system must manage the functionality of each open-channel SSD.

For example, a modern data center (i.e., a system) stores and process petabytes of data on a monthly basis. This storage includes a physical layer of disks (e.g., open-channel SSDs) and software abstraction that exposes the disks to applications that control physical storage within such disks. Separating the software abstraction layer from the physical layer for each open-channel SSD has the disadvantage of consuming an increasingly larger proportion of system resources as additional open-channel SSDs are deployed within the system.

Accordingly, there is an unmet demand for a system that can easily scale to accommodate any number of open-channel SSDs and can efficiently manage a plurality of open-channel SSDs in groups or pools rather than at the individual device level, thereby reducing system overhead, increasing the efficiency of garbage collection and reducing wear on individual open-channel SSDs.

BRIEF DESCRIPTION OF THE INVENTION

In one embodiment, a method of implementing a plurality of open channel SSDs over a network includes receiving a request over a network to create an abstracted memory structure having a first capacity, identifying a plurality of open channel SSDs accessible over the network that have memory blocks with free pages, determining that the identified memory blocks with free pages have a cumulative capacity greater than or equal to the first capacity, allocating free pages from the plurality of open channel SSDs to create the abstracted memory structure, maintaining physical addresses corresponding to the allocated free pages of the plurality of open channel SSDs, and assigning the abstracted memory structure to a host device connected to the network.

In one embodiment, the request to create the abstracted memory structure further comprises identifying a reliability. In one embodiment, allocating memory from the plurality of open channel SSDs further comprises identifying memory blocks having the smallest erase count.

In one embodiment, the method further comprises assigning the abstracted memory structure to a second host device connected to the network. In another embodiment, the method further comprises assigning a part of the abstracted memory structure to a second host device connected to the network.

In one embodiment, the method further comprises, detecting a total capacity of the network. In one embodiment, the method further comprises reducing the total capacity of the network by reserving a second capacity. In another embodiment, the method further comprises detecting a total capacity assigned to all preexisting abstracted memory structures of the network. In another embodiment, the method further comprises detecting a total capacity of written data within all preexisting abstracted memory structures of the network.

In one embodiment, the method further comprises maintaining the abstracted memory structure within a non-volatile memory. In one embodiment, the method further comprises, maintaining an access control list identifying that the abstracted memory structure is assigned to the host device.

In one embodiment, a method of implementing a plurality of open channel SSDs over a network includes receiving a command and identification information from a host device over a network, using the identification information to identify an abstracted memory structure comprised of a plurality of open channel SSDs connected to the network, determining that the host device has access to the abstracted memory structure, identifying a physical address within the abstracted memory structure corresponding to the command, wherein the physical address comprises a memory block and a memory page of one of the plurality of open channel SSDs accessible via the network, sending the physical address to the host device, and detecting that the host device issued the command over the network using the physical address.

In one embodiment, the method further comprises detecting that the command is a read command. In another embodiment, the method further comprises detecting that the command is a write command. In another embodiment, the method further comprises detecting a capacity associated with the write command.

In one embodiment, the method further comprises detecting a trigger that initiates a bad block management process. In one embodiment, the detecting a trigger comprises detecting a failure to execute the command issued by the host device. In one embodiment, the method further comprises identifying bad blocks associated with a failure to execute the command issued by the host device.

In one embodiment, the method further comprises identifying a reliability mechanism associated with the bad blocks and repairing the bad blocks using the detected reliability mechanism. In one embodiment, the method further comprises updating a bad block list to identify the bad blocks.

DETAILED DESCRIPTION OF THE INVENTION

Figure 1:
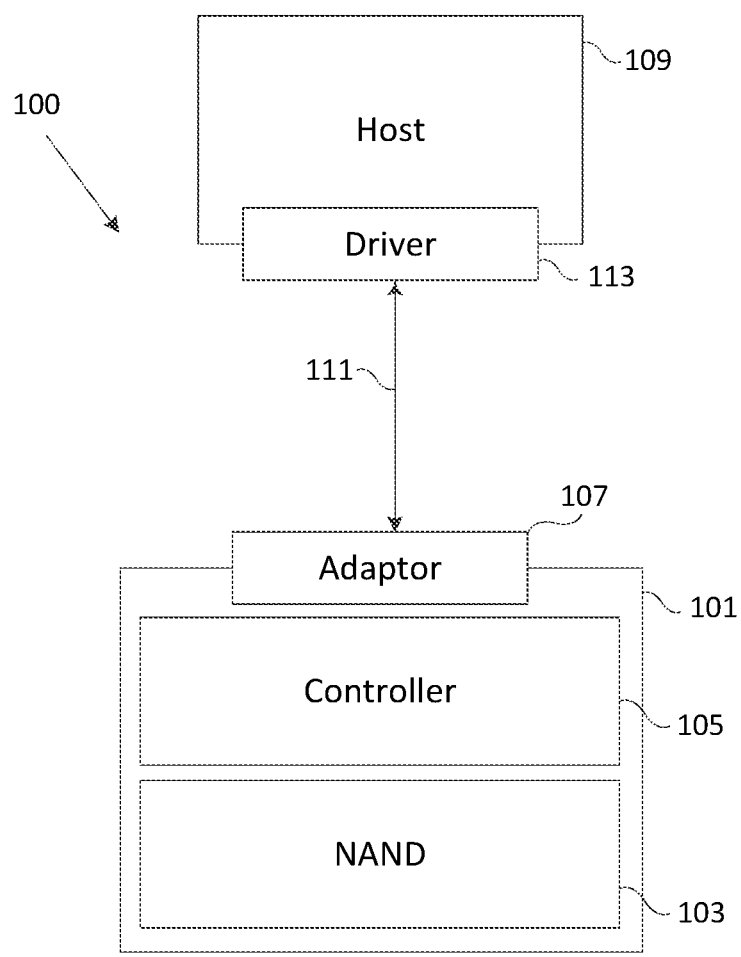
FIG. 1 is a block diagram of one embodiment implementing an open channel SSD.

FIG. 1 is a block diagram illustrating one embodiment of a system 100 for implementing an open channel SSD 101. Open channel SSD 101 includes a NAND memory 103 and a controller 105. Controller 105 does not include an FTL, and instead, has the limited functionality of performing error correction and interfacing with a host device 109 (e.g., a computer) through an adaptor 107 over a connection 111. Adaptor 107 can be any type of standard interface, including, but not limited to, Peripheral Component Interconnect Express (PCIe), Serial Attached SCSI (SAS), Serial ATA (SATA), or any other interface known in the art. Open channel SSD 101 has a standard form factor (e.g., 2.5 inch NVME, SAS or SATA, M.2, U.2 or any other standard interface) and can be inserted into any standard computer platform (e.g., a server).

Controller 105 of open channel SSD 101 exposes the physical geometry of the NAND memory 103 to the host 109. The geometry of NAND memory 103 includes, for example, the number of blocks, the number of pages in a block and the size of each page, among other parameters. The host 109 uses a driver 113 that encapsulates a NAND API to communicate with controller 105 to retrieve the geometry of the NAND memory 103 and execute program, read and erase commands on specific blocks and pages of the NAND memory 103.

Figure 2:
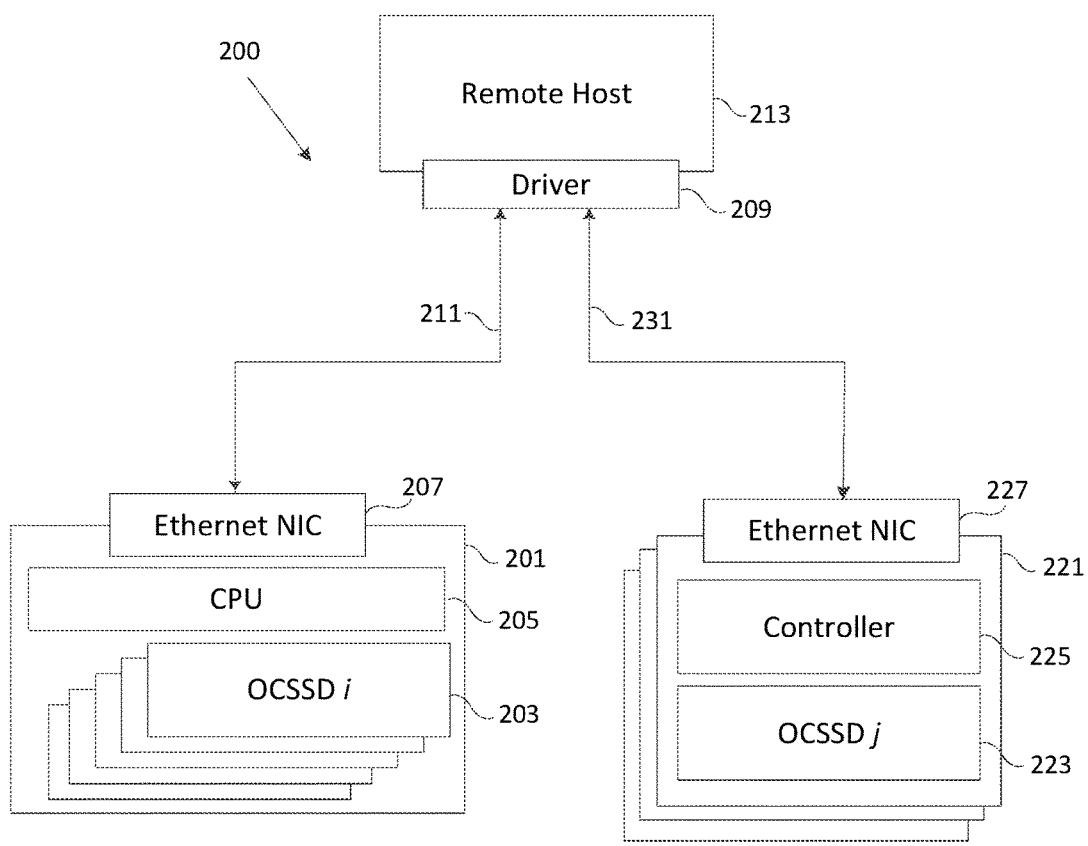
FIG. 2 is a block diagram of one embodiment implementing a plurality of open channel SSDs over a network.

FIG. 2 is a block diagram illustrating one embodiment of implementing a plurality of open channel SSDs over a network 200. In one embodiment, an open channel device 201 includes a plurality of open channel SSDs 203, a CPU 205, and a network interface card 207. The plurality of open channel SSDs 203 are connected to the open channel device 201 using a standard interface including, but not limited to, Peripheral Component Interconnect Express (PCIe), Serial Attached SCSI (SAS), Serial ATA (SATA), or any other interface known in the art. The CPU 205 functions as the controller for the plurality of open channel SSDs 203 and exposes the geometry of each of the plurality of open channel SSDs 203 to the remote host 213 through a driver 209 that encapsulates an open channel API. CPU 205 may also perform other functions unrelated to the plurality of open channel SSDs 203. The driver 209 communicates with CPU 205 to identify a device ID corresponding to each of the plurality of open channel SSDs 203. The network interface card 207 enables Ethernet connectivity between open channel device 201 and remote host 213.

Remote host 213 accesses open channel device 201 over network connection 211 by implementing a transport protocol such as iSCSI, NVMe over Fabric (NVMeoF) or any other transport protocol known in the art. Remote host 213 can further access any one of the open channel SSDs 203 through driver 209 by using the corresponding device ID. Remote host 213 can use driver 209 to communicate with controller 205 and execute program, read and erase commands on specific blocks and pages of each of the plurality of open channel SSDs 203.

In one embodiment, remote host 213 accesses an open channel device 221 over a network connection 231. The open channel device 221 includes an open channel SSD 223 (similar in function to each of the plurality of open channel SSDs 203), a controller 225 that exposes the geometry of open channel SSD 223, and a network interface card 227 (similar in function to network interface card 207). As illustrated in FIG. 2, any number of open channel devices 221 may be connected to the network such that remote host 213 can access each of the open channel devices 221 over network connection 231.

In another embodiment, there may be any number of open channel devices 201 and/or any number of open channel devices 221 comprising the plurality of open channel SSDs implemented over network 200. Network connections 211 and 213 may comprise any type of wired or wireless network connections known in the art.

Figure 3:
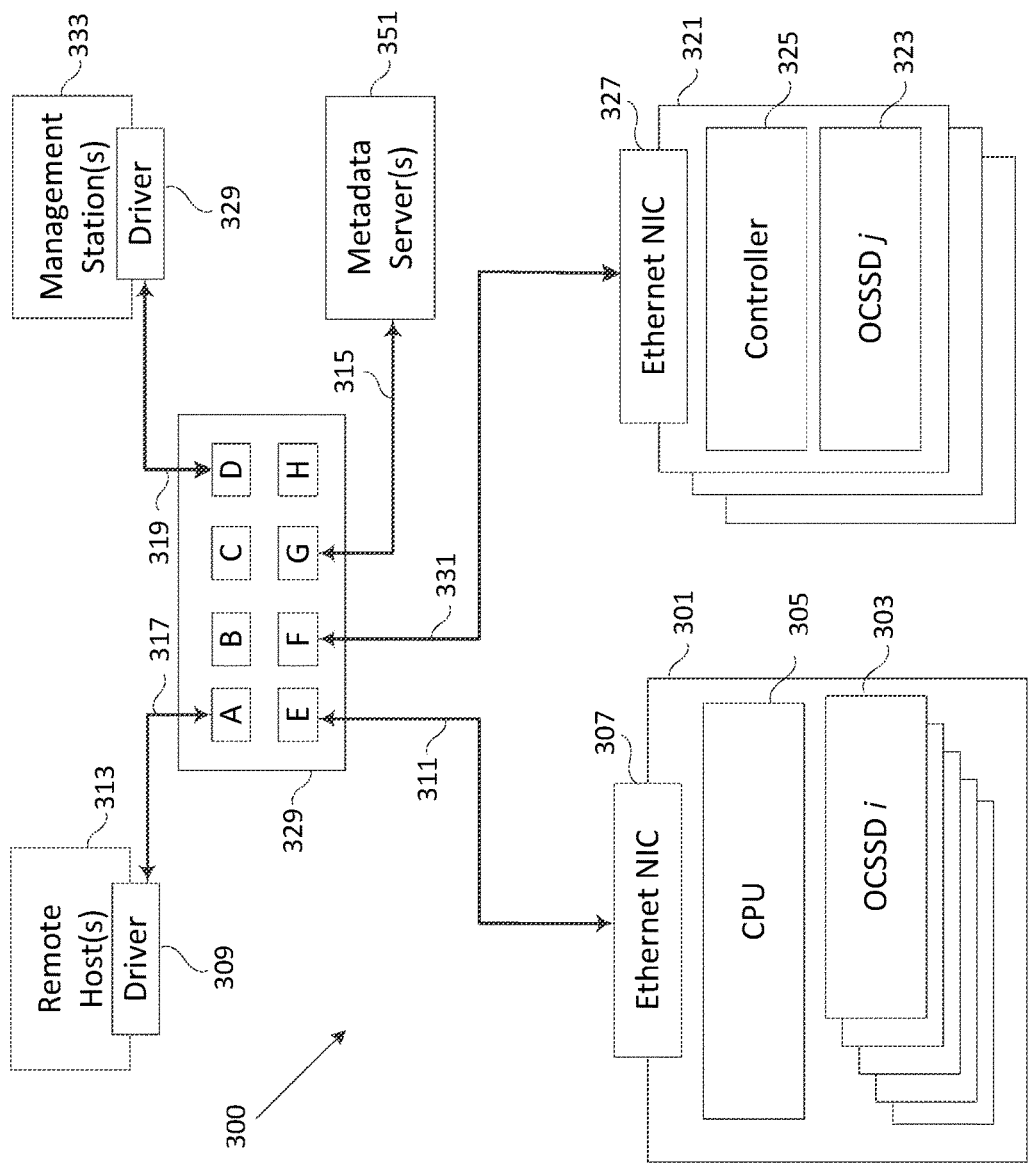
FIG. 3 is a block diagram of one embodiment implementing a plurality of open channel SSDs over a network.

FIG. 3 is a block diagram illustrating one embodiment of implementing a plurality of open channel SSDs over a network 300. An open channel device 301 includes a plurality of open channel SSDs 303, a CPU 305, and a network interface card 307 (all of which have similar functionality to the corresponding components 201, 203, 205, and 207 of FIG. 2). An open channel device, 321 includes an open channel SSD 323, a controller 325 that exposes the geometry of open channel SSD 323, and a network interface card 327 (all of which have similar functionality to the corresponding components 221, 223, 225, 227 and 229 of FIG. 2). In one embodiment, there may be any number of open channel devices 301 and/or any number of open channel devices 321 comprising the plurality of open channel SSDs implemented over network 300. Open channel SSD 323 (identified in FIG. 3 as OCSSD j) and each of the plurality of open channel SSDs 303 (identified in FIG. 3 as OCSSD i) may be identified by any naming convention (e.g., numeral, character and the like).

One or more remote hosts 313 are capable of accessing open channel device 301 and/or open channel device 321 over a network switch 329. Network switch 329 is comprised of a plurality of nodes (identified in FIG. 3 as nodes A-H). Nodes within network 300 may be identified by any convention (e.g., numeral, character and the like). In a preferred embodiment, each of the plurality of open channel SSDs accessible via a particular node of network switch 329 has a unique identifier. In another embodiment, every open channel SSD in network 300 has a unique identifier. Similar to remote host 313, one or more management stations 333 are capable of accessing open channel device 301 and/or open channel device 331 over network switch 329.

Remote host 313 communicates with devices over network 300 through node A of network switch 329 over network connection 317. A driver 309 encapsulates an open channel API that allows remote host(s) 313 to communicate with open channel device 301 and/or open channel device 321. Management station 333 communicates with devices over network 300 through node D of network switch 329 over network connection 319. A driver 329 encapsulates an open channel API that allows management station(s) 333 to communicate with open channel device 301 and/or open channel device 321.

One or more metadata servers 351 are connected to node G of network switch 329 over network connection 315. Metadata server 351 includes a mapping of nodes and devices within network 300 by maintaining a list of identifiers (e.g., Internet Protocol (IP) address, or any other unique identifier). Any device within network 300 can send a request to metadata server 351 to identify the network location of any other device in network 300. For example, any management station 333 may send a request to identify the network location of one or more remote host(s) 313, open channel device 301, open channel device 321, or any open channel SSD 303 or 323. Similarly, any remote host 313 may send a request to identify the network location of open channel device 301, open channel device 303, or any open channel SSD 303 or 323. In one embodiment, any number of nodes may be added to network 300 by adding additional network switches 329. Further, any number of devices may be added to the network 300 by adding devices to available nodes. When nodes and/devices are added or removed from network 300, the mapping of nodes and devices within metadata server 351 is updated to reflect such changes.

In one embodiment, management station 333 sends a request to metadata server 351 to create one or more abstracted memory structures using the plurality of open channel SSDs 303 that comprise open channel device(s) 301 and/or the open channel SSDs 323 that comprise open channel devices 321. The request to create an abstracted memory structure may include various parameters including capacity (e.g., 1 GigaByte) and reliability (e.g., RAID1 mirrored storage), among other parameters. Management station 333 may request that metadata server 351 use any type of reliability scheme for creating an abstracted memory structures, including, for example, eager simple (i.e., a single array mapping virtual address to physical page location), RAID1 mirror (i.e., two or more arrays mapping virtual address to physical page location, such that a corrupted array can be recovered using one or more of the mirrored arrays), RAID5 (i.e., an array mapping virtual address to physical page location and parity location, such that corrupted data can be recovered using the parity information), or any other reliability scheme known in the art.

Management station 333 may request that the abstracted memory structure is comprised of part or all of the open channel SSD memory capacity comprising any of the following: one or more nodes of network switch 329; one or more devices connected to network switch 329; one or more blocks within a particular open channel SSD 303 or 323; one or more pages within a block of a particular open channel SSD 303 or 323; and any combination thereof. Metadata server 351 creates the abstracted memory structure(s) in response to the request from management station 333 and maintains a mapping of the nodes, devices, blocks and/or pages comprising such subsystem(s) (i.e., the physical NAND mapping).

In one embodiment, management station 333 requests that metadata server 351 assign one or more abstracted memory structures to one or more host devices 313 connected to network 300 over network switch 329. In one embodiment, one or more abstracted memory structures may be assigned to a single host device 313. In another embodiment, one or more abstracted memory structures may be shared by a plurality of host devices 313. In another embodiment, a part of an abstracted memory structure may be assigned to one or more host devices 313. Metadata server 351 maintains a list of all abstracted memory structures and controls whether one or more host devices 313 have access to one or more of such subsystems.

In one embodiment, when a new host device 313 is added to network 300, management station 333 requests that the metadata server 351 create an abstracted memory structure for such host device. In one embodiment, the metadata server 351 does not create the requested abstracted memory structure for the new host device 313 unless the sum of the requested capacity for the new abstracted memory structure and the total capacity of abstracted memory structures assigned to preexisting host devices does not exceed the total page capacity of network 300. In one embodiment, a portion of the total page capacity of network 300 is reserved as an over-provision for maintaining speed and performance. Accordingly, in this embodiment, the total page capacity of network 300 is reduced by the portion of the total page capacity reserved as an over-provision. In another embodiment, metadata server 333 may assign an aggregate capacity greater than the total capacity of network 300 if previously assigned capacity is not fully written with data (i.e., assigned capacity is not fully used). In this embodiment, if data utilization exceeds the total capacity, the metadata server 333 sends an alert to one or more of the management stations 333.

In one embodiment, any node comprising network 300 can send a request to metadata server 351 to create an abstracted memory structure. In another embodiment the mapping of abstracted memory systems is maintained with a centralized global repository (not shown) in communication with metadata server 351. In one embodiment, the centralized global repository is comprised of a non-volatile memory (e.g., PROM, EPROM, EEPROM, FRAM, NVRAM, flash, or any other type of non-volatile memory known in the art). In another embodiment, a plurality of metadata servers 351 and/or centralized global repositories are used for redundancy and to maintain high speed performance.

Figure 4:
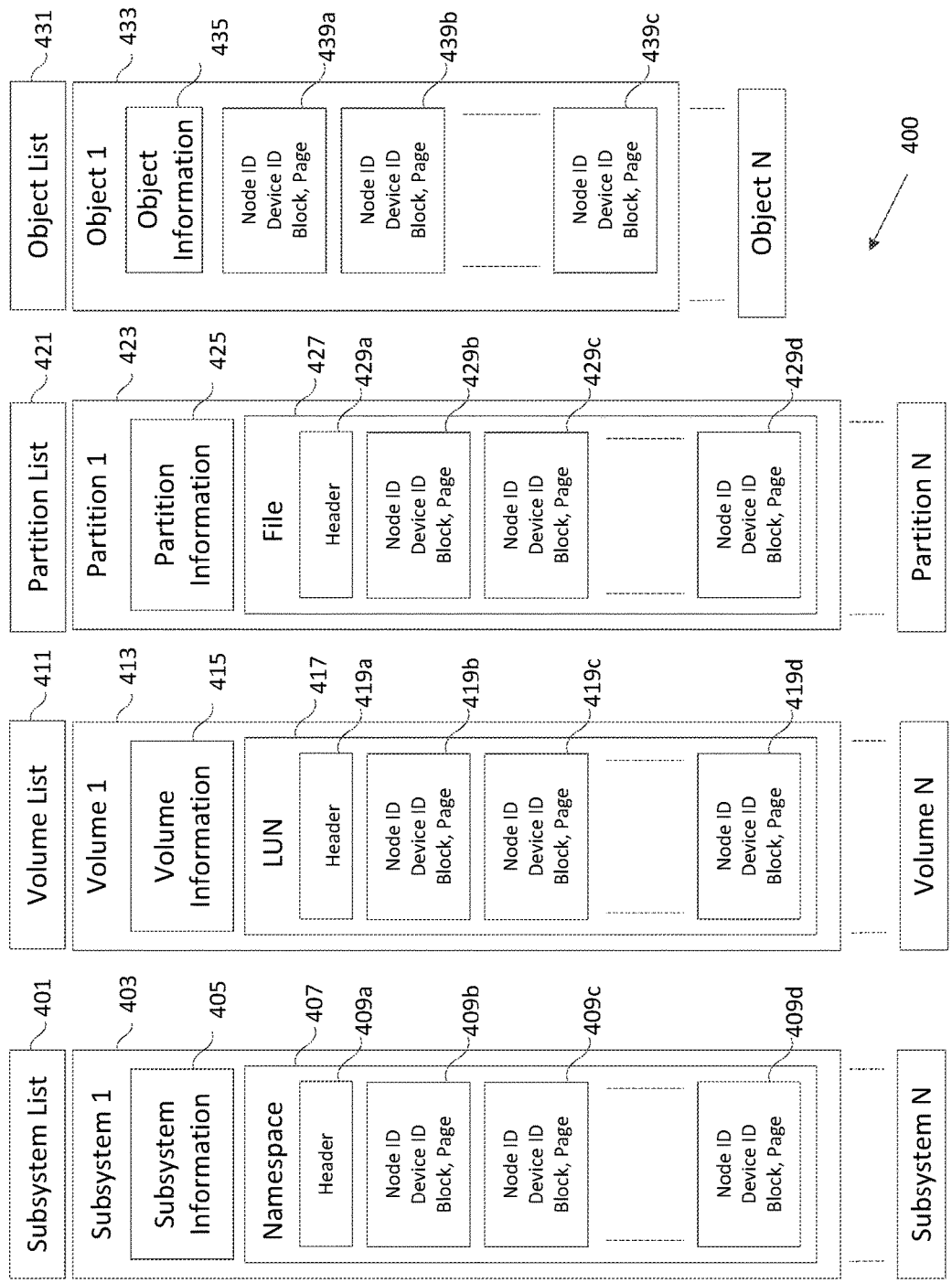
FIG. 4 is a block diagram of one embodiment of implementing abstracted memory structures for a plurality of open channel SSDs over a network.

FIG. 4 is a block diagram illustrating one embodiment of implementing abstracted memory structures 400 for a plurality of open channel SSDs over a network. As discussed with respect to FIG. 3, management station 333 sends a request to metadata server 351 to create one or more abstracted memory structures 400 using the plurality of open channel SSDs 303 that comprise open channel device(s) 301 and/or the open channel SSDs 323 that comprise open channel devices 321. The abstracted memory structures 400 may comprise any form as illustrated by FIG. 4.

In one embodiment, the abstracted memory structure 400 comprises one or more subsystems 403. Each subsystem 403 has a unique identifier that is maintained by the metadata server 351 in a subsystem list 401. Each subsystem 403 may further be comprised of one or more namespaces 407. Each subsystem 403 includes subsystem information 405 that describes parameters of the subsystem. Subsystem information 405 includes subsystem capacity (e.g., 1 Gigabyte), an access control list that identifies the devices (e.g., host devices 300) that have access to a particular subsystem over network 300, and/or a list of namespace information that comprises each subsystem 403, among other parameters. Each namespace 407 includes header information 409a that describes parameters of the namespace and virtual pages 409b, 409c and 409d that comprise namespace 407. A namespace 407 may be comprised of any number of virtual pages. Header information 409a includes namespace capacity (e.g., 500 Megabytes), and mapping between the virtual pages comprising the namespace and the location of the physical pages (i.e., the location of the physical memory pages across one or more open channel SSDs 323 and/or 321 on the same or different devices of a single node or different nodes of the network), among other parameters. In one embodiment, virtual pages 409b, 409c and 409d identify the location of the corresponding physical pages by referencing the node ID, device ID, block and page where the physical page resides (e.g., network Node E, device OCSSD 1, Block 1, Page 1). Any naming convention or identifier may be used to identify the location of the physical pages that correspond to virtual pages 409b, 409c and 409d. In one embodiment, the abstracted memory structure 400 comprised of subsystems 403 and namespaces 407 meets the NVMe specification or any other specification known in the art.

In one embodiment, the abstracted memory structure 400 comprises one or more volumes 413. Each volume 413 has a unique identifier that is maintained by the metadata server 351 in a volume list 411. Each volume 413 may further be comprised of one or more logical unit numbers (LUNs) 417. Each volume 413 includes volume information 415 that describes parameters of the volume. Volume information 415 may include volume capacity (e.g., 1 Gigabyte), an access control list that identifies the devices (e.g., host devices 300) that have access to a particular volume over network 300, and/or a list of LUN information that comprises each volume 413, among other parameters. Each LUN 417 may include header information 419a that describes parameters of the LUN and virtual pages 419b, 419c and 419d that comprise LUN 417. An LUN 417 may be comprised of any number of virtual pages. Header information 419a includes LUN capacity (e.g., 500 Megabytes), and mapping between the virtual pages comprising the LUN and the location of the physical pages (i.e., the location of the physical memory pages across one or more open channel SSDs 323 and/or 321 on the same or different devices of a single node or different nodes of the network), among other parameters. In one embodiment, virtual pages 419b, 419c and 419d identify the location of the corresponding physical pages by referencing the node ID, device ID, block and page where the physical page resides (e.g., network Node E, device OCSSD 1, Block 1, Page 1). Any naming convention or identifier may be used to identify the location of the physical pages that correspond to virtual pages 419b, 419c and 419d. In one embodiment, the abstracted memory structure 400 comprised of volumes 413 and LUNs 417 meets the SCSI specification or any other specification known in the art.

In one embodiment, the abstracted memory structure 400 comprises one or more partitions 423. Each partition 423 has a unique identifier that is maintained by the metadata server 351 in a partition list 421. Each partition 423 may further be comprised of one or more files 427. Each partition 423 includes partition information 425 that describes parameters of the partition. Partition information 425 includes partition capacity (e.g., 1 Gigabyte), an access control list that identifies the devices (e.g., host devices 300) that have access to a particular partition over network 300, and/or a list of file information that comprises each partition 423, among other parameters. Each file 427 includes header information 429a that describes parameters of the file and virtual pages 429b, 429c and 429d that comprise file 427. A file 427 may be comprised of any number of virtual pages. Header information 429a includes file capacity (e.g., 500 Megabytes), and mapping between the virtual pages comprising the file and the location of the physical pages (i.e., the location of the physical memory pages across one or more open channel SSDs 323 and/or 321 on the same or different devices of a single node or different nodes of the network), among other parameters. In one embodiment, virtual pages 429b, 429c and 429d identify the location of the corresponding physical pages by referencing the node ID, device ID, block and page where the physical page resides (e.g., network Node E, device OCSSD 1, Block 1, Page 1). Any naming convention or identifier may be used to identify the location of the physical pages that correspond to virtual pages 429b, 429c and 429d. In one embodiment, the abstracted memory structure 400 comprised of partitions 423 and files 427 is a file system that meets any known file system specification, including, for example, NTFS, FAT32, FAT, HPFS, or any other specification known in the art.

In one embodiment, the abstracted memory structure 400 comprises one or more objects 433. Each object 433 has a unique identifier that is maintained by the metadata server 351 in an object list 431. Each object 433 is further comprised of virtual pages 439b, 439c and 439d. Each object 433 includes object information 435 that describes parameters of the object. Object information 435 includes object capacity (e.g., 100 Megabytes), object metadata identifying the type of object (e.g., EXIF for a JPG image), an access control list that identifies the devices (e.g., host devices 300) that have access to a particular object over network 300, and/or mapping between the virtual pages comprising the object and the location of the physical pages (i.e., the location of the physical memory pages across one or more open channel SSDs 323 and/or 321 on the same or different devices of a single node or different nodes of the network), among other parameters. An object 437 may be comprised of any number of virtual pages. In one embodiment, virtual pages 439b, 439c and 439d identify the location of the corresponding physical pages by referencing the node ID, device ID, block and page where the physical page resides (e.g., network Node E, device OCSSD 1, Block 1, Page 1). Any naming convention or identifier may be used to identify the location of the physical pages that correspond to virtual pages 439b, 439c and 439d.

Figure 5:
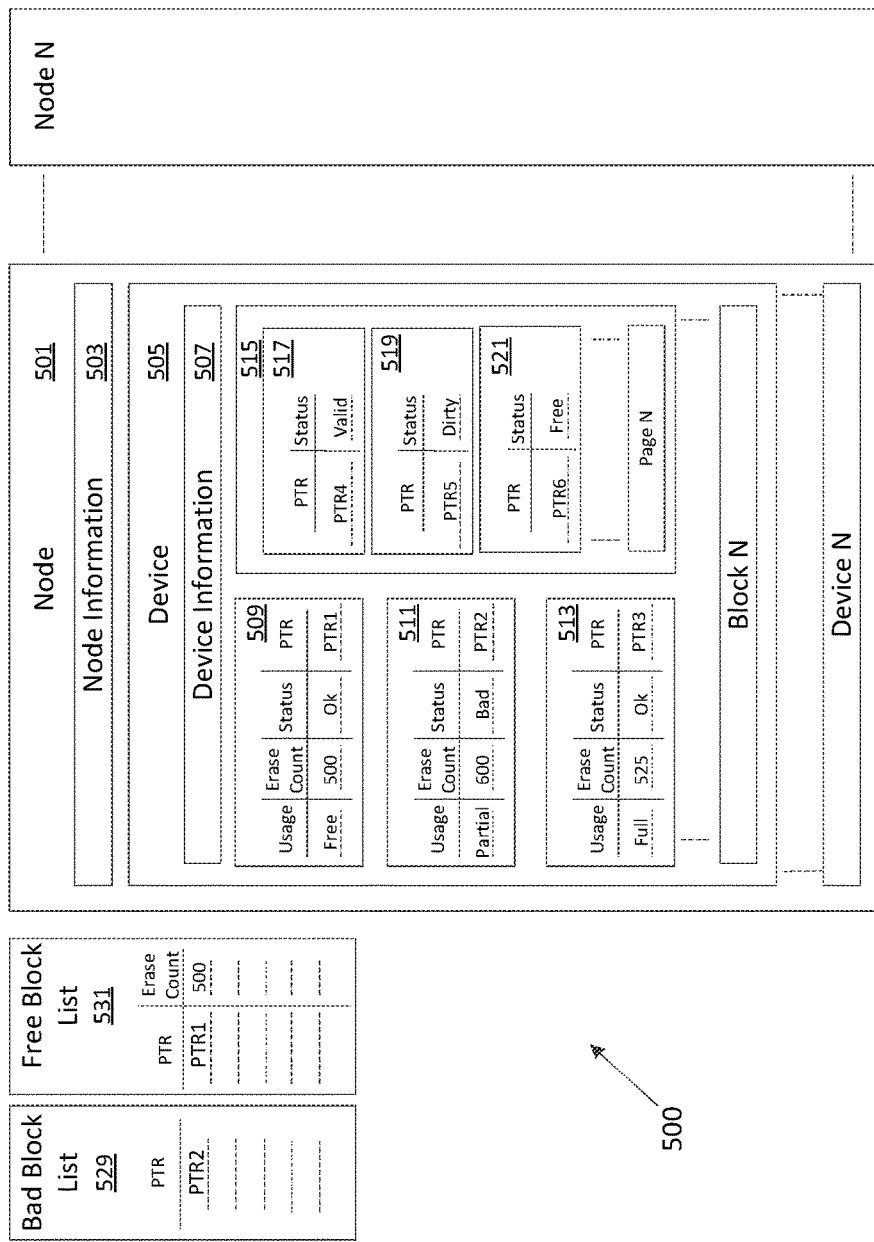
FIG. 5 is a block diagram of one embodiment of maintaining physical mapping information for a plurality of open channel SSDs over a network.

FIG. 5 is a block diagram illustrating one embodiment of maintaining physical mapping information 500 for a plurality of open channel SSDs over a network. As discussed with respect to FIG. 3, metadata server 351 maintains a list of all nodes that comprise network 300, and the list of open channel devices 301 and 321 that comprise each node. In one embodiment, network 300 is comprised of one or more nodes, including node 501. Metadata server 351 maintains a list of nodes including node information 503 corresponding to node 501. Node information 503 identifies node parameters, including a node identifier (e.g., IP address or equivalent), number of devices comprising the node, identifiers for each device comprising the node, and vendor information for each device, among other parameters. In one embodiment, node 501 is comprised of one or more devices, including device 505. Metadata server 351 maintains a list of devices comprising node 501, including device information 507 corresponding to device 505. Device information 507 identifies device parameters, including device geometry (i.e., the number of blocks that comprise the device, the number of pages per block, and the size of each page), among other parameters. In one embodiment, device 505 is comprised of blocks 509, 511 and 513. In one embodiment metadata server 351 maintains block information for each of blocks 509, 511 and 513, including an erase counter (i.e., the number of times a block has been erased), block usage (i.e., whether the block is free, partially written or fully written), status (i.e., whether the block is functional/okay or non-functional/bad), and a pointer referencing the block, among other information. For example, block information for block 509 indicates the block is "free," has been erased 500 times, has a status of "ok," and can be identified by "PTR 1." Block information for block 511, indicates the block is "partial[ly]" used, has been erased 600 times, has a status of "bad" and can be identified by "PTR 2."

Metadata server 351 further maintains a bad block list 529 and a free block list 531. In one embodiment, bad block list 529 and free block list 531 are maintained as part of device information 507 of device 505. In another embodiment, bad block list 529 and free block list 531 contain bad block and free block information for each of the plurality of open channel SSDs over the network. In one embodiment, when block information for a particular block identifies the block as "bad," metadata server 351 updates bad block list 529 with the pointer corresponding to the bad block. For example, the pointer for bad block 511 (PTR 2) is identified on bad block list 529. In one embodiment, when block information for a particular block identifies the block as "free," metadata server 351 updates free block list 531 with the pointer corresponding to the block and identifies the block erase count. For example, the pointer for free block 509 (PTR1) is identified on free block list 531. In a preferred embodiment, the blocks identified on free block list 531 are sorted by erase count.

In one embodiment, device 505 is further comprised of block 515. Block 515 is comprised of pages 517, 519 and 521. Metadata server 351 maintains page information for each of pages 517, 519 and 521, including status of the page data and a pointer referencing the page, among other information. For example, page 517 has a status of "valid" (i.e., includes valid data), page 519 has a status of "dirty" (i.e., includes old/invalid data), and page 521 has a status of "free" (i.e., has no data). Blocks having pages containing "dirty" data (i.e., dirty data) are processed during a garbage collection process executed by the metadata server 351. In one embodiment, a page with dirty data is, for example, updated or new data that is not stored anywhere else, or data that would otherwise be permanently lost because it is not stored in non-volatile memory.

In one embodiment device 505 may be comprised of any number of blocks, and each block may be comprised of any number of pages. In another embodiment, Node 501 may be comprised of any number of devices. In another embodiment, network 300 may be comprised of any number of nodes. Although FIG. 5 illustrates the use of pointers to identify a particular block or page in network 300, any identifier can be used instead of or in addition to a pointer. In one embodiment when a node is added or removed from the network 300, metadata server 351 updates the node list. In another embodiment, when a device is added or removed from a node, metadata server 351 updates the device list.

Figure 6:
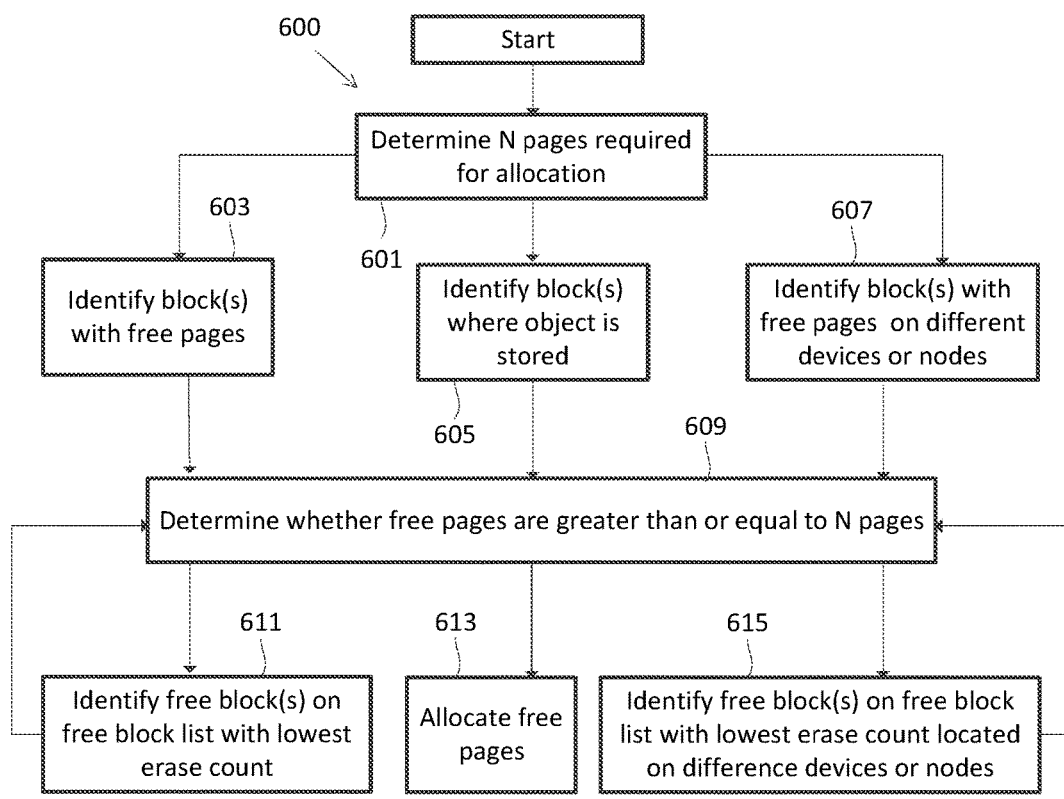
FIG. 6 is a flow chart of steps for one embodiment of allocating memory from a plurality of open channel SSDs over a network.

FIG. 6 is a flow chart of steps 600 illustrating one embodiment of allocating memory from a plurality of open channel SSDs over a network. As discussed with respect to FIG. 3, when management station 333 sends a request to metadata server 351 to create one or more abstracted memory structures 400, metadata server 351 allocates physical pages and blocks that comprise one or more memory devices attached to one or more nodes within network 300. As discussed with respect to FIG. 5, metadata server 351 maintains lists identifying the nodes within network 300, all devices connected to a particular node, and blocks and pages of each device. In one embodiment, when a management station 333 requests that metadata server 351 create an abstracted memory structure 400, metadata server 351 allocates memory for the abstracted data structure by allocated physical blocks and pages from one or more devices connected to one or more nodes within network 300. In another embodiment, when a host device 313 issues a command to write or program data to a particular abstracted memory structure 400, metadata server 351 allocates physical blocks and/or pages corresponding to the abstracted memory structure for the write or program operation. In another embodiment, metadata server 351 may allocate additional capacity to an abstracted memory structure 400 when the abstracted memory structure 400 is fully written with data such that no further data may be written.

At step 601, metadata server 351 receives a request to allocate memory. The request to allocate memory is either sent by management station 333 or by a host device 313 regarding one or more existing or one or more new abstracted memory structures 400. Metadata server 351 calculates the number of memory pages that must be allocated to satisfy the memory allocation request.

In one embodiment, metadata server 351 allocates memory capacity using a simple eager algorithm. In this embodiment, the method steps 600 moves from step 601 to step 603. At step 603, metadata server 351 identifies blocks within the applicable abstracted memory structure 400 that are partially written (e.g., partially written block 511). At step 609, metadata server 351 determines whether the identified pages from partially written blocks are greater than or equal to the number of pages required for allocation (step 601). If the identified pages are sufficient to satisfy the allocation request, the method steps proceed to step 613 and metadata server 351 allocates the identified pages. If the identified pages are not sufficient to satisfy the allocation request, the method steps proceed to step 611 and metadata server 351 identifies free blocks with the smallest erase count on free block list 531 (e.g., free block 509 identified by "PTR1"). In one embodiment, at step 611, metadata server 351 uses only free blocks to identify a sufficient number of pages to satisfy the allocation request. In another embodiment, metadata server 351 uses pages from partially written blocks identified in step 603 in combination with pages from blocks on free block list 531 to satisfy the allocation request. The method steps 600 then proceed back to step 609 to determine whether the pages identified in step 611 are sufficient to satisfy the allocation request.

In one embodiment, metadata server 351 allocates memory pages for an object from the same blocks where the object is stored. In this embodiment, the method steps 600 moves from step 601 to step 605. At step 605, metadata server 351 identifies free pages on partially written blocks where the object is stored (e.g., partially written block 511). At step 609, metadata server 351 determines whether the identified pages from partially written blocks are greater than or equal to the number of pages required for allocation (step 601). If the identified pages are sufficient to satisfy the allocation request, the method steps proceed to step 613 and metadata server 351 allocates the identified pages. If the identified pages are not sufficient to satisfy the allocation request, the method steps proceed to step 611 and metadata server 351 identifies free blocks with the smallest erase count on free block list 531 (e.g., free block 509 identified by "PTR1"). In one embodiment, at step 611, metadata server 351 uses only free blocks to identify a sufficient number of pages to satisfy the allocation request. In another embodiment, metadata server 351 uses pages from partially written blocks identified in step 605 in combination with pages from blocks on free block list 531 to satisfy the allocation request. The method steps 600 then proceed back to step 609 to determine whether the pages identified in step 611 are sufficient to satisfy the allocation request.

In one embodiment metadata server 351 allocates memory pages in accordance with a particular reliability policy (e.g., from different devices on the same node or different devices on different nodes of network 300). For example, if the specified reliability policy is RAID 5 arranged in groups of N units, allocated pages should come from at least N different devices for device-level reliability or N different nodes for node-level reliability (e.g., N may be defined as 3 units or any other number of units). In this embodiment, the method steps 600 moves from step 601 to step 607. At step 607, metadata server 351 identifies free pages on partially written blocks of different devices or different nodes, as specified by the reliability policy (e.g., partially written block 511). At step 609, metadata server 351 determines whether the identified pages from partially written blocks are greater than or equal to the number of pages required for allocation (step 601). If the identified pages are sufficient to satisfy the allocation request, the method steps proceed to step 613 and metadata server 351 allocates the identified pages. If the identified pages are not sufficient to satisfy the allocation request, the method steps proceed to step 611 and metadata server 351 identifies free blocks with the smallest erase count on free block list 531 (e.g., free block 509 identified by "PTR1") of different devices or different nodes, as specified by the reliability policy. In one embodiment, at step 611, metadata server 351 uses only free blocks to identify a sufficient number of pages to satisfy the allocation request. In another embodiment, metadata server 351 uses pages from partially written blocks identified in step 607 in combination with pages from blocks on free block list 531 to satisfy the allocation request. The method steps 600 then proceed back to step 609 to determine whether the pages identified in step 611 are sufficient to satisfy the allocation request.

In each of the preceding embodiments, if the pages identified in step 611 are sufficient to satisfy the allocation request, at step 613, the metadata server 351 allocates such pages in response to the request. If the pages identified in step 611 are not sufficient to satisfy the allocation request, the metadata server 351 responds with a message indicating that the abstracted memory structure 400 has insufficient capacity for the requested allocation. In one embodiment, metadata server 351 may resolve such insufficient capacity for the requested allocation by allocating unused capacity within network 300 or unused capacity from another abstracted memory subsystem within network 300.

In one embodiment, block information (e.g., blocks 509, 511 and 513 identifying block information) and/or page information (e.g., block 515 with page 517, 519 and 521 identifying page information) identifies the reliability mechanism (e.g., mirror, RAID and the like). In one embodiment, the abstracted memory structure information (e.g., 405, 415, 425 or 435) and/or header information (e.g., 409a, 419a or 429a) identifies the reliability mechanism (e.g., mirror, RAID, and the like).

Figure 7:
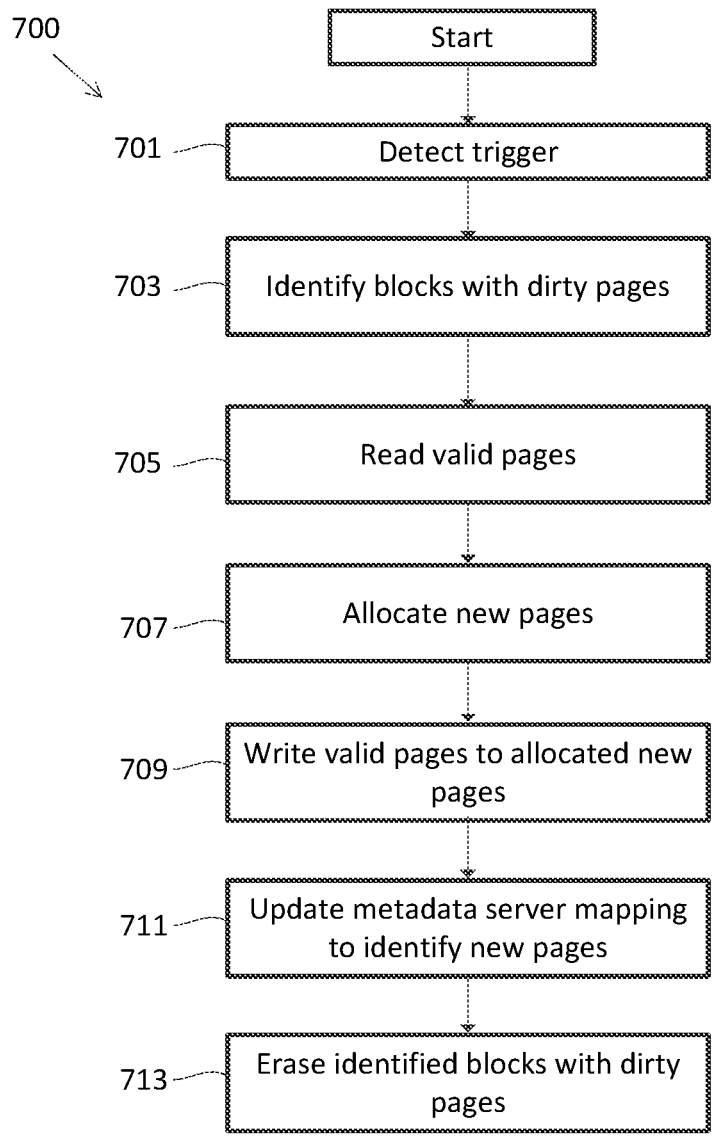
FIG. 7 is a flow chart of steps for one embodiment of garbage collection from a plurality of open channel SSDs over a network.

FIG. 7 is a flow chart of steps for one embodiment of garbage collection from a plurality of open channel SSDs over a network. As discussed with respect to FIG. 5, Metadata server 351 maintains page information for each of pages 517, 519 and 521, including status of the page data and a pointer referencing the page, among other information. The metadata server 351 executes a sequence of garbage collection steps to process pages containing "dirty" data (e.g., page 519). At step 701, metadata server 351 detects a trigger within network 300 that causes the metadata server to initiate the garbage collection process within one or more abstracted memory structures 400. In one embodiment, for each abstracted memory structure 400, the management station 333 may set a threshold number of free blocks at which the metadata server 351 initiates the garbage collection process for the respective abstracted memory structure 400. In another embodiment, the threshold may be set by any computer within network 300, including remote host(s) 313 or metadata server(s) 351. In another embodiment, the threshold for garbage collection for one or more abstracted memory structures 400 may be periodic.

At step 703, metadata server 351 identifies blocks having pages with dirty data within the respective abstracted memory structure(s) 400 using page information within each block (e.g., block 515) of each device (e.g., device 505) attached to each node (e.g., node 501) of network 300 that comprise the respective abstracted memory structure(s) 400. In one embodiment, valid pages are pages with data that is not invalid or stale and pages with dirty data are a subset of the valid pages. In order to ensure that the pages with dirty data are written to an allocated page before such pages are erased in step 713, at step 705, metadata server 351 reads the valid pages (e.g., pages 517 and 521) from each block (e.g., block 515) that contains pages with dirty data (e.g., page 519) and determines the number of valid pages read. In one embodiment, the metadata server 351 also identifies whether the valid pages read are associated with a particular namespace 407 within a subsystem 403, a particular LUN 417 within a volume 413, a particular file 427 within a partition 423, or a particular object 433.

At step 707, metadata server 351 allocates new pages equivalent to the number of valid pages read. As discussed with respect to FIG. 6, allocation of new pages may be performed in various different ways. At step 709, metadata server 351 writes the valid pages read (step 705) to the allocated pages (step 707). At step 711, the metadata server 351 updates the physical block and page information for the valid pages written to the allocated pages (step 709). In one embodiment, metadata server 351 updates the physical block and page information to the allocated pages (step 707) for the valid pages (step 705) that correspond to a particular namespace 407, LUN 417, file 427 or object 433. At step 713, the metadata server 351 sends a command erasing the blocks with pages having dirty data (e.g., block 515).

Figure 8:
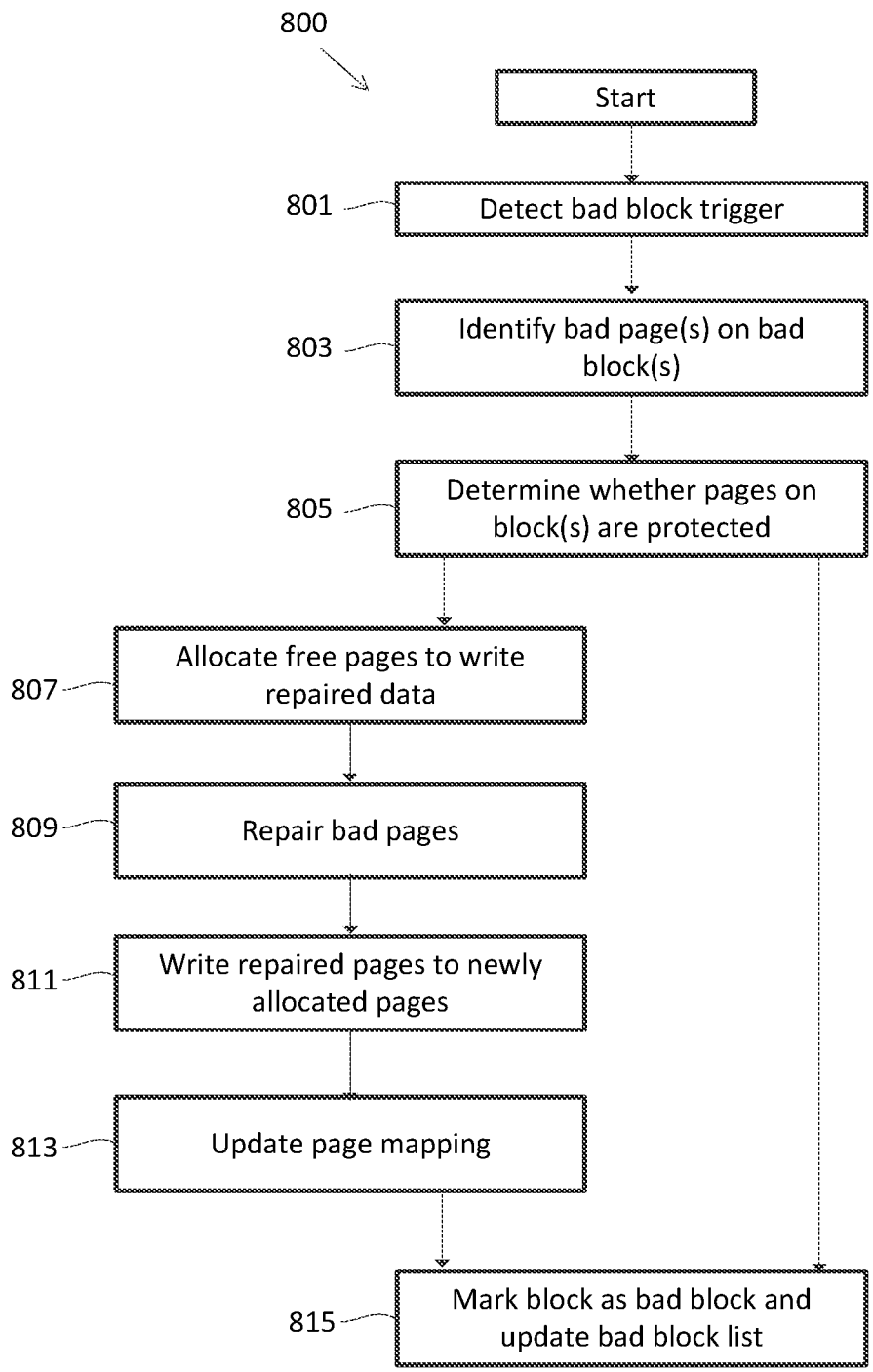
FIG. 8 is a flow chart of steps for one embodiment of managing bad blocks in a plurality of open channel SSDs over a network.

FIG. 8 is a flow chart 800 of steps for one embodiment of managing bad blocks in a plurality of open channel SSDs over a network. As discussed with respect to FIG. 5, Metadata server 351 maintains block information for each of blocks 509, 511 and 513, including status of the block and a pointer referencing the block, among other information. The metadata server 351 executes a process for managing bad blocks (e.g., block 511). At step 801, metadata server 351 detects a trigger within network 300 that causes the metadata server to initiate the bad block management process within one or more abstracted memory structures 400. In one embodiment, for each abstracted memory structure 400, the management station 333 may set a threshold number of bad blocks at which the metadata server 351 initiates the bad block management process for the respective abstracted memory structure 400. In another embodiment, the threshold may be set by any computer within network 300, including remote host(s) 313 or metadata server(s) 351. In another embodiment, the threshold for initiating the bad block management process for one or more abstracted memory structures 400 may be periodic. In a preferred embodiment, the threshold for initiating the bad block management process may be related to a command failure, such as a failure to execute a read or write command initiated by one of the computers (e.g., remote host(s) 313, management station(s) 333, and/or metadata server(s) 351) within network 300.

At step 803, metadata server 351 identifies bad blocks within the respective abstracted memory structure(s) 400 using block information for each block (e.g., blocks 509, 511 and 513) of each device (e.g., device 505) attached to each node (e.g., node 501) of network 300 that comprise the respective abstracted memory structure(s) 400. At step 805, metadata server 351 determines whether pages on the bad blocks are protected by a reliability mechanism (e.g., mirror, RAID and the like). In one embodiment, metadata server 351 identifies the reliability mechanism from block information (e.g., blocks 509, 511 and 513 identifying block information) and/or page information (e.g., block 515 with page 517, 519 and 521 identifying page information). In another embodiment, metadata server 351 identifies the reliability mechanism from the abstracted memory structure information (e.g., 405, 415, 425 or 435) and/or header information (e.g., 409a, 419a or 429a). If the pages on the bad block are protected by a reliability mechanism, per flow chart 800, the process moves from step 805 to step 807. At step 807, metadata server 351 allocates new pages to repair the pages on the bad blocks (e.g., as discussed with respect to FIG. 6). At step 809, metadata server 351 repairs the bad pages using the appropriate reliability mechanism. For example, if the bad pages are protected by mirror reliability, metadata server 351 identifies the physical location of the mirrored pages and reads the data from the mirrored pages. If the bad pages are protected by RAID reliability, metadata server 351 uses the parity pages to repair the bad pages. At step 811, metadata server 351 writes the repaired pages (step 809) to the newly allocated pages (step 807). At step 813, metadata server 351 updates the physical block and page information for the repaired pages written to the allocated pages. At step 815, metadata server 351 marks the status of the bad blocks as "bad" (e.g., block 511) and updates the bad block list 529 by adding a reference (e.g., pointer "PTR2"), referencing the bad block. In one embodiment, any reference may be used within bad block list 529 to identify bad blocks (e.g., block 511).

At step 805, if metadata server 351 determines that the pages are not protected by a reliability mechanism, per the flow chart 800, the process moves from step 805 to step 815. As discussed above, at step 815, metadata server 351 sets the status of the bad blocks as "bad" (e.g., block 511) and updates the bad block list 529 by adding a reference (e.g., pointer "PTR2"), referencing the bad block.

Figure 9:
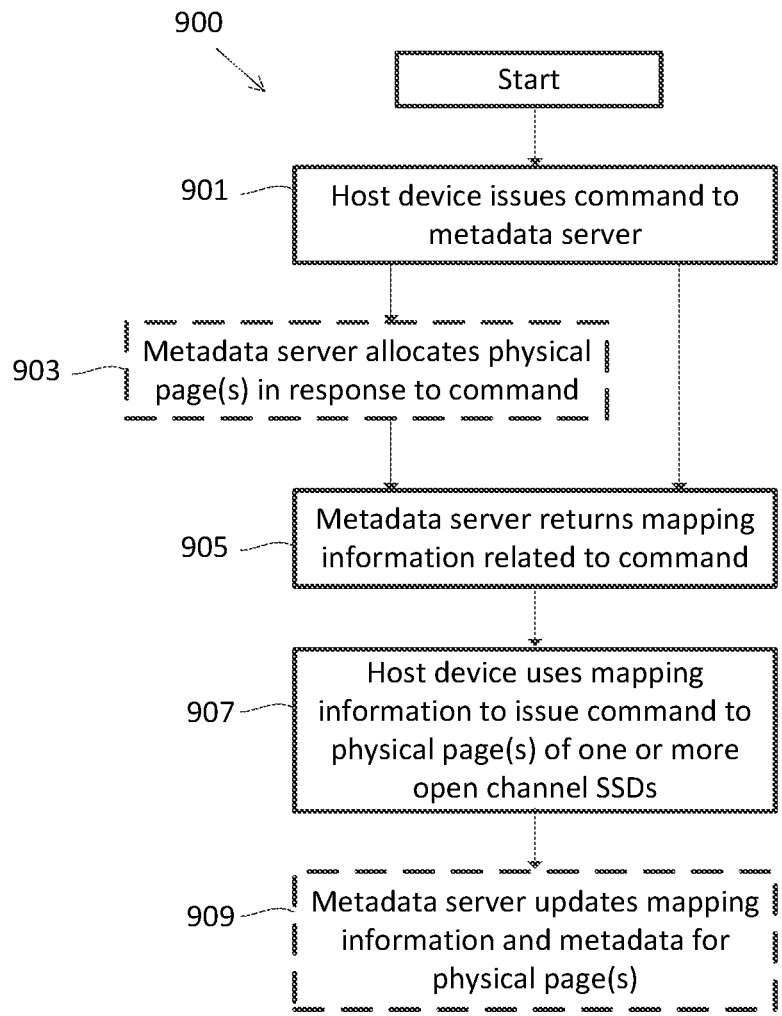
FIG. 9 is a flow chart of steps for one embodiment of implementing a plurality of open channel SSDs over a network.

FIG. 9 depicts a flow chart 900 showing steps for one embodiment of implementing a plurality of open channel SSDs over a network. For the sake of clarity, the flow chart 900 will be described in connection with the embodiments of FIG. 3, FIG. 4 and FIG. 6. At step 901, a remote host 313 issues a command to metadata server 351. In one embodiment, multiple remote hosts 313 may simultaneously issue one or more commands to metadata server 351.

If the command issued by remote host 313 is a write command, the process moves from step 901 to step 903. In one embodiment, the read command includes identification information for the abstracted memory structure (e.g., identifying subsystem 403 and namespace 407, volume 413 and LUN 417, partition 423 and file 427, or object 423) and the length of the write command. At step 903, metadata server 351 allocates physical pages in response to the write command (e.g., as discussed with respect to FIG. 6). At step 905, metadata server 351 returns mapping information corresponding to the write command to remote host 313. In one embodiment, the mapping information identifies the location of the physical block and pages corresponding to the write command. In another embodiment, the mapping information identifies the node (e.g., node E), the device (e.g., open channel device 301), the open channel SSD (e.g., OCSSD 303), and the block and page numbers corresponding to the write command. At step 907, remote host 313 uses the physical block and page mapping information to issue one or more write commands to write the data to each page of the corresponding OCSSD(s) (e.g., OCSSDs 303 and/or 323) identified in the mapping information. In one embodiment, if the allocated pages are protected by mirror reliability, remote host 313 uses the physical block and page mapping information for each of the mirror locations to issue one or more write commands to write the data to each page of the corresponding OCSSD(s) (e.g., OCSSDs 303 and/or 323) identified in the mapping information for each mirror location. In another embodiment, if the allocated pages are protected by RAID reliability, remote host 313 uses the physical block and page mapping information to issue one or more write commands to write the data and parity data to each page of the corresponding OCSSD(s) identified in the mapping information. At step 909, the metadata server 351 updates mapping information identifying the physical blocks and pages where the data is written. Metadata server

351 also updates block information (e.g., sets block usage as "partial" or "full") and page information (e.g., sets page status as "valid"). If the data written by remote host 313 was previously written at another location (i.e., old data), metadata server 351 updates the status of the page information containing the old data as "dirty" (e.g., page 519) for the next garbage collection process (as discussed with respect to FIG. 7).

If the command issued by remote host 313 is a read command, the process moves from step 901 to step 905. In one embodiment, the read command includes identification information for the abstracted memory structure (e.g., identifying subsystem 403 and namespace 407, volume 413 and LUN 417, partition 423 and file 427, or object 423) and the virtual pages corresponding to the command. At step 905, metadata server 351 returns mapping information corresponding to the read command to remote host 313. In one embodiment, the mapping information identifies the location of the physical block and pages corresponding to the read command. In another embodiment, the mapping information identifies the node (e.g., node E), the device (e.g., open channel device 301), the open channel SSD (e.g., OCSSD 303), and the block and page numbers corresponding to the read request. In one embodiment, if the pages corresponding to the read command are protected by mirror reliability, metadata server 351 sends mapping information for all mirror locations comprising the requested data. In this embodiment, host device 313 determines for each page the mirror location from which to read the data. In another embodiment, if the page corresponding to the read command are protected by RAID reliability, the metadata server 351 sends mapping information including data pages and parity pages. In this embodiment, the remote host 313 may use the parity pages to repair the data if there is a read error. At step 907, remote host 313 issues one or more read commands to read the data from each page of the corresponding OCSSD(s) identified in the mapping information. The method steps 900 for a read command terminate at step 907.

In another embodiment remote host 313 may issue a get command read an object or a put command to write an object such as a JPG image (e.g., object 433). The method steps for getting or putting an object are similar to the method steps for reading or writing data as discussed above.

Other objects, advantages and embodiments of the various aspects of the present invention will be apparent to those who are skilled in the field of the invention and are within the scope of the description and the accompanying Figures. For example, but without limitation, structural or functional elements might be rearranged, or method steps reordered, consistent with the present invention. Similarly, principles according to the present invention could be applied to other examples, which, even if not specifically described here in detail, would nevertheless be within the scope of the present invention.

What is claimed is:

1. A method of implementing a plurality of open channel SSDs over a network, the method comprising:
receiving, by a server, a first request from a host device over a network to create an abstracted memory structure having a first capacity and a first reliability policy;
identifying, by the server, a plurality of open channel SSDs accessible over the network that have memory blocks with free pages;
determining, by the server, that the identified memory blocks with free pages have a cumulative capacity greater than or equal to the first capacity;
allocating, by the server, free pages from the plurality of open channel SSDs to create the abstracted memory structure;
maintaining, by the server, physical addresses corresponding to the allocated free pages of the plurality of open channel SSDs;
assigning, by the server, the abstracted memory structure to the host device connected to the network;
receiving, by the server, a second request from the host to access the abstracted memory structure; and
sending, in response to the second request, physical mapping address information to the host for directly addressing by the host one or more open channel SSDs of the plurality of SSDs over the network.

2. The method of claim 1, wherein the first reliability policy indicates a RAID type.

3. The method of claim 1, wherein allocating memory from the plurality of open channel SSDs further comprises identifying memory blocks having the smallest erase count.

4. The method of claim 1, further comprising assigning, by the server, the abstracted memory structure to a second host device connected to the network.

5. The method of claim 1, further comprising assigning, by the server, a part of the abstracted memory structure to a second host device connected to the network.

6. The method of claim 2, further comprising detecting, by the server, a total capacity of the network.

7. The method of claim 6, further comprising reducing, by the server, the total capacity of the network by reserving a second capacity.

8. The method of claim 6, further comprising detecting, by the server, a total capacity assigned to all preexisting abstracted memory structures of the network.

9. The method of claim 6, further comprising detecting, by the server, a total capacity of written data within all preexisting abstracted memory structures of the network.

10. The method of claim 1, further comprising maintaining, by the server, the abstracted memory structure within a non-volatile memory.

11. The method of claim 1, further comprising maintaining, by the server, an access control list identifying that the abstracted memory structure is assigned to the host device.

12. A method of implementing a plurality of open channel SSDs over a network, the method comprising:
receiving, by a server, a command and identification information from a host device over a network;
using the identification information to identify an abstracted memory structure comprised of a plurality of open channel SSDs connected to the network;
determining, by the server, that the host device has access to the abstracted memory structure;
identifying, by the server, a physical address within the abstracted memory structure corresponding to the command, wherein the physical address comprises a memory block and a memory page of one of the plurality of open channel SSDs accessible via the network;
sending, by the server, the physical address to the host device; and
detecting, by the server, that the host device issued the command over the network to one of the plurality of open channel SSDs using the physical address.

13. The method of claim 12, further comprising detecting, by the server, that the command is a read command.

14. The method of claim 12, further comprising detecting, by the server, that the command is a write command.

15. The method of claim 14, further comprising detecting, by the server, a capacity associated with the write command.

16. The method of claim 12, further comprising detecting, by the server, a trigger that initiates a bad block management process.

17. The method of claim 16, wherein detecting a trigger, by the server, comprises detecting a failure to execute the command issued by the host device.

18. The method of claim 16, further comprising identifying, by the server, bad blocks associated with a failure to execute the command issued by the host device.

19. The method of claim 18, further comprising identifying, by the server, a reliability mechanism associated with the bad blocks and repairing the bad blocks using the detected reliability mechanism.

20. The method of claim 19, further comprising updating, by the server, a bad block list to identify the bad blocks.

\* \* \* \* \*